(12) United States Patent
Larsson

(10) Patent No.: US 10,566,777 B2
(45) Date of Patent: Feb. 18, 2020

(54) MOUNTING ARRANGEMENT FOR MOUNTING A DEVICE, AND METHODS FOR MOUNTING AND DISMOUNTING A DEVICE

(71) Applicant: AXIS AB, Lund (SE)

(72) Inventor: Stefan Larsson, Lund (SE)

(73) Assignee: AXIS AB, Lund (SE)

( * ) Notice: Subject to any disclaimer, the term of this patent is extended or adjusted under 35 U.S.C. 154(b) by 476 days.

(21) Appl. No.: 15/159,164

(22) Filed: May 19, 2016

(65) Prior Publication Data

US 2016/0360656 A1    Dec. 8, 2016

(30) Foreign Application Priority Data

Jun. 3, 2015 (EP) ...................................... 15170392

(51) Int. Cl.
*H02G 3/22* (2006.01)
*F16B 13/08* (2006.01)
(Continued)

(52) U.S. Cl.
CPC ................. *H02G 3/22* (2013.01); *E04B 2/00* (2013.01); *E04B 9/006* (2013.01); *F16B 13/04* (2013.01);
(Continued)

(58) Field of Classification Search
CPC ...... F21V 21/04; F21V 21/042; F21V 21/043; F21V 21/046; H02G 3/12; H02G 3/22; E03C 1/0401; E03C 1/0402; E03C 2001/0416; F16M 13/027; F16M 11/10; E04B 2/00; E04B 9/006; H05K 13/00;
(Continued)

(56) References Cited

U.S. PATENT DOCUMENTS 2,192,484 A * 3/1940 Bryan ..................... B05C 11/00
                                                  285/148.5
2,404,169 A * 7/1946 Gidden ................. B25B 31/005
                                                  411/340
(Continued)

FOREIGN PATENT DOCUMENTS

EP          2045512 A1      4/2009
GB          2514685 A       3/2014
WO      WO-2005119069 A1 * 12/2005  .......... F16B 13/0833

*Primary Examiner* — Hiwot E Tefera
*Assistant Examiner* — Taylor L Morris
(74) *Attorney, Agent, or Firm* — Volpe and Koenig, P.C.

(57) ABSTRACT

A mounting arrangement for mounting a device in an opening is disclosed. The arrangement comprises an outer sleeve, an inner sleeve arranged inside the outer sleeve, and an adjustment ring arranged inside the outer sleeve. A flange is arranged at a first end of the outer sleeve, arranged to receive said device. The flange is adapted to abut an outer surface of the structure. The inner sleeve is arranged in threaded engagement with the adjustment ring or with the outer sleeve. The adjustment ring comprises a fixing wing extending outwardly through a longitudinally extending aperture in the outer sleeve, the fixing wing having an abutment portion adapted to abut an inner surface of the structure. By relative rotary motion of the inner and outer sleeve, the adjustment ring is movable along a longitudinal direction of the arrangement for adjustment to a thickness of the structure.

13 Claims, 9 Drawing Sheets

(51) Int. Cl.
*F21V 21/04* (2006.01)
*F16B 13/04* (2006.01)
*F21V 17/12* (2006.01)
*F16M 13/02* (2006.01)
*E04B 9/00* (2006.01)
*E04B 2/00* (2006.01)
*E03C 1/04* (2006.01)

(52) U.S. Cl.
CPC ....... *F16B 13/0833* (2013.01); *F16M 13/027* (2013.01); *F21V 17/12* (2013.01); *F21V 21/04* (2013.01); *F21V 21/043* (2013.01); *E03C 1/0401* (2013.01); *E03C 1/0402* (2013.01); *E03C 2001/0416* (2013.01)

(58) Field of Classification Search
CPC ...... F16B 13/04; F16B 13/0833; F16B 21/02; F16B 5/02
USPC ................... 174/152 G, 668; 248/27.3, 343; 403/197, 239, 252, 260, 261; 411/211, 411/344, 345
See application file for complete search history.

(56) References Cited

U.S. PATENT DOCUMENTS

| | | | | |
|---|---|---|---|---|
| 4,229,614 A * | 10/1980 | Smolik | ........... | H02G 3/125 144/144.1 |
| 4,553,277 A * | 11/1985 | Duncan | ........... | E03C 1/0401 137/359 |
| 4,764,065 A * | 8/1988 | Johnson | ........... | F16B 13/08 24/625 |
| 5,045,978 A * | 9/1991 | Gargle | ........... | F21V 31/00 362/101 |
| 5,226,768 A * | 7/1993 | Speer | ........... | F16B 13/0808 411/21 |
| 5,264,994 A * | 11/1993 | Choi | ........... | F21S 8/02 362/148 |
| 5,465,749 A * | 11/1995 | Sauter | ........... | E03C 1/0401 137/315.15 |
| 5,482,329 A * | 1/1996 | McCall | ........... | F16L 41/14 137/318 |
| 5,515,882 A * | 5/1996 | Hennis | ........... | E03C 1/0401 137/315.12 |
| 5,567,041 A * | 10/1996 | Slocum | ........... | F21S 8/02 362/148 |
| 5,971,444 A * | 10/1999 | Hawkins | ........... | H02G 3/22 285/139.2 |
| 6,004,088 A * | 12/1999 | Hunt | ........... | F16B 13/0808 411/21 |
| 6,385,798 B1 * | 5/2002 | Burns | ........... | E03C 1/0401 137/359 |
| 6,394,690 B1 * | 5/2002 | Bartholoma | ........... | F16L 5/027 403/290 |
| 6,554,458 B1 * | 4/2003 | Benghozi | ........... | F21V 21/04 362/147 |
| 6,571,407 B1 * | 6/2003 | Skarie | ........... | E03C 1/0401 137/359 |
| 6,631,730 B1 * | 10/2003 | Bloom | ........... | E03C 1/0401 137/359 |
| 6,678,903 B1 * | 1/2004 | Rhodes | ........... | E03C 1/0401 137/359 |
| 6,969,802 B1 * | 11/2005 | George | ........... | H02G 3/0658 174/152 G |
| 6,983,570 B2 * | 1/2006 | Mead | ........... | E04F 15/02452 248/188.2 |
| 7,001,126 B2 * | 2/2006 | Lesecq | ........... | F16B 19/1054 411/340 |
| 7,172,160 B2 * | 2/2007 | Piel | ........... | F16B 13/0808 248/231.9 |
| 7,393,168 B2 * | 7/2008 | Wei | ........... | F16B 21/02 411/21 |
| 7,475,465 B1 * | 1/2009 | Weiss | ........... | B25B 27/023 28/255 |
| 7,628,366 B2 * | 12/2009 | Scott | ........... | F21V 21/04 248/317 |
| 7,731,130 B2 * | 6/2010 | Decanio | ........... | H04R 1/2873 248/27.3 |
| 7,877,941 B2 * | 2/2011 | Fischer | ........... | E04G 15/061 174/64 |
| 7,979,929 B2 * | 7/2011 | Vogel | ........... | E03C 1/0401 4/695 |
| 8,132,435 B2 * | 3/2012 | Thomas | ........... | E05B 65/0021 70/95 |
| 8,256,728 B2 * | 9/2012 | Wright | ........... | H04R 1/025 181/150 |
| 8,407,828 B2 * | 4/2013 | Vogel | ........... | E03C 1/23 4/678 |
| 8,465,182 B1 * | 6/2013 | Davis | ........... | F21V 21/042 248/342 |
| 8,791,377 B2 * | 7/2014 | Jafari | ........... | H02G 3/0691 174/660 |
| 8,814,400 B2 * | 8/2014 | Warton | ........... | F21S 8/06 174/520 |
| 8,899,259 B2 * | 12/2014 | Jonte | ........... | E03C 1/0402 137/315.12 |
| 8,925,172 B2 * | 1/2015 | English | ........... | F16B 13/04 108/158.11 |
| 2002/0189674 A1 * | 12/2002 | Meeder | ........... | E03C 1/0401 137/359 |
| 2003/0145437 A1 * | 8/2003 | Medgyes | ........... | F16B 5/0692 24/290 |
| 2007/0217207 A1 | 9/2007 | Caluori | | |
| 2008/0131231 A1 * | 6/2008 | Kuna | ........... | E03C 1/0401 411/433 |
| 2008/0200064 A1 * | 8/2008 | Chong | ........... | H02G 3/22 439/571 |
| 2010/0326678 A1 * | 12/2010 | Monden | ........... | A62C 2/06 169/54 |
| 2012/0281410 A1 * | 11/2012 | Wong | ........... | F21V 21/043 362/249.02 |
| 2013/0021784 A1 | 1/2013 | Jang et al. | | |
| 2014/0158958 A1 * | 6/2014 | Callahan | ........... | H02G 3/12 254/134.3 R |
| 2014/0174579 A1 * | 6/2014 | Wilkerson | ........... | E03C 1/0401 137/801 |
| 2014/0174818 A1 * | 6/2014 | Bingham, Jr. | ........... | H02G 3/22 174/668 |
| 2018/0219365 A1 * | 8/2018 | Pagoto | ........... | H02G 3/22 |

* cited by examiner

MOUNTING ARRANGEMENT FOR MOUNTING A DEVICE, AND METHODS FOR MOUNTING AND DISMOUNTING A DEVICE

CROSS REFERENCE TO RELATED APPLICATION

This application claims the benefit of European Patent Application No 15170392.3 filed on Jun. 3, 2015, which is incorporated by reference as if fully set forth.

FIELD OF INVENTION

The present invention relates to mounting of a device in an opening in a structure.

BACKGROUND

There are many situations in which it is desirable to mount a device in an opening in a structure. For instance, spotlights, loudspeakers, or monitoring cameras may be mounted recessed in a ceiling or a wall. For many such mountings, a dedicated arrangement is used for simplifying the mounting procedure. Some mounting arrangements are generally made up of a cup having fixing legs arranged on screws extending through the cup. Before the cup is inserted in an opening in which it is to be mounted, the fixing legs are rotated inwardly, towards the cup. Once the cup has been inserted in the opening, the fixing legs are rotated outwardly from the cup by operating the screws. By continued operation of the screws, the fixing legs will move along the screws for adaptation to the thickness of the wall or ceiling. Such a mounting arrangement may securely hold a device mounted in the opening, but it may be difficult to operate the screws while simultaneously holding the arrangement in place.

An example of a mounting arrangement that may be easier to install may be seen in EP 2 045 512, which discloses a holder generally in the form of a cup. At an outer end, the cup has a flange arranged to abut against an outer surface of, e.g., a ceiling. At an inner end, the cup has openings through which spring-biased supporting legs extend outwardly. For inserting the holder in an opening, the supporting legs may be pivoted towards each other and held such that they extend in a longitudinal direction of the cup. Once the cup has been inserted in the opening, the supporting legs may be released and are by spring force pivoted out and down towards an inner surface of the ceiling. In this manner, the holder is retained in the opening. Such a mounting arrangement simplifies recessed mounting, but in some situations, it would be beneficial to have a mounting arrangement that may be manufactured at a lower cost.

SUMMARY

It is an object of the present invention to provide a mounting arrangement that may enable easy mounting of a device in an opening in a structure.

Another object is to provide a mounting arrangement that may be manufactured at a low cost.

It is a further object of the invention to provide a method of mounting a device in an opening in a structure which is easy to perform.

Yet another object is to provide a practical method of dismounting a device from an opening in a structure.

According to a first aspect, these and other objects are achieved, in full or at least in part, by a mounting arrangement for mounting a device in an opening in a structure, said arrangement comprising: an outer sleeve, an inner sleeve arranged inside said outer sleeve, an adjustment ring arranged inside said outer sleeve, said outer sleeve having a first end and a second end, wherein a flange is arranged at said first end, and wherein said first end is arranged to receive said device, said flange extending radially outwardly from said outer sleeve and being adapted to abut an outer surface of said structure around said opening, said outer sleeve having at least one aperture extending longitudinally along a portion of said outer sleeve, said inner sleeve being arranged in threaded engagement with said adjustment ring or with said outer sleeve, said adjustment ring comprising at least one fixing wing extending outwardly from said adjustment ring through said at least one aperture in said outer sleeve, said fixing wing having an abutment portion adapted to abut an inner surface of said structure around said opening, wherein by relative rotary motion of said inner and outer sleeve, said adjustment ring is movable along a longitudinal direction of said arrangement for adjustment to a thickness of said structure. With such an arrangement it is possible to mount a device in an opening in a structure in an easy way, without the need for tools.

According to an embodiment, the inner sleeve has an outer thread and the adjustment ring has an inner thread which is arranged in threaded engagement with the outer thread. The inner sleeve may be easily accessible through the first end of the outer sleeve throughout the adjusting procedure, such that it may be conveniently rotated in relation to the outer sleeve. With the adjustment ring arranged in threaded engagement on the outside of the inner sleeve, the adjustment ring may be adjusted to a wide range of thicknesses of the structure in which the device is to be mounted without the inner sleeve having to move longitudinally along the outer sleeve.

The adjustment ring may be arranged around the inner sleeve and inside the outer sleeve.

According to another embodiment, the inner sleeve has an outer thread and the outer sleeve has an inner thread which is arranged in threaded engagement with the outer thread.

The adjustment ring may be attached to the inner sleeve such that rotation of the adjustment ring and the inner sleeve in relation to each other is enabled. Thereby, the inner sleeve may be rotated in relation to the outer sleeve, while the adjustment ring remains non-rotary in relation to the outer sleeve.

The fixing wings may be foldable towards a longitudinal axis of the arrangement for insertion into the opening. In this manner, the mounting arrangement may conveniently be inserted in the opening, even though the wings have too wide a radial extension in their non-folded position.

In an embodiment, the outer sleeve at the second end comprises a respective folder portion at an end of each aperture, said folder portion being arranged to fold the fixing wings when the adjustment ring is moved up inside said folder portions. Such folder portions make it possible to fold the wings after the mounting arrangement has been mounted in the opening, such that the mounting arrangement may be removed from the opening.

Each fixing wing may have at least two axially spaced attachment points on said adjustment ring. Hereby, a higher load on the fixing wings may be enabled, such that the device mounted with the arrangement may be securely held in the opening in the structure.

The structure in which the device is mounted may be a ceiling or a wall.

The mounting arrangement may be made of plastic. Thereby, the mounting arrangement may be manufactured at a low cost.

According to a second aspect, the above-mentioned objects are achieved, in full or at least in part, by a method of mounting a device in an opening in a structure, comprising the steps of: inserting a mounting arrangement in said opening, said mounting arrangement comprising an outer sleeve, an inner sleeve arranged inside said outer sleeve, and an adjustment ring arranged inside said outer sleeve, said adjustment ring comprising at least one fixing wing extending outwardly from said adjustment ring through a longitudinally extending aperture in said outer sleeve, abutting a flange extending radially from a first end of said outer sleeve against an outer surface of said structure around said opening, rotating said outer and inner sleeves in relation to each other, thereby causing said adjustment ring to move along a longitudinal direction of said arrangement, until said fixing wings abut an inner surface of said structure around said opening, and arranging said device in said arrangement. With such a method, it is possible to easily mount a device in an opening in a structure, even without tools.

The device may be arranged in the arrangement after said mounting arrangement has been mounted in the opening. Hereby, the inner and outer sleeves of the mounting arrangement may be easily accessible during mounting in the opening. Further, the mounting arrangement may be securely mounted in the opening before it is loaded with the weight of the device.

In a variant of the method, the fixing wing is folded down towards a longitudinal axis of the arrangement by inserting the mounting arrangement in the opening. Thus, the radial extension of the arrangement may easily be reduced allowing insertion in the opening.

According to a third aspect, the above-mentioned objects are achieved, in full or at least in part, by a method of dismounting a device mounted in an opening in a structure, said device being arranged in a mounting arrangement comprising an outer sleeve, an inner sleeve arranged inside the outer sleeve, and an adjustment ring arranged inside the outer sleeve, said adjustment ring comprising at least one fixing wing extending outwardly from the adjustment ring through a longitudinally extending aperture in the outer sleeve, the method comprising the steps of: driving the inner sleeve into the outer sleeve causing the adjustment ring to move along the outer sleeve, until the fixing wing reaches a folder portion arranged at an end of the aperture at a second end of the outer sleeve, such that the fixing wing is folded down towards a longitudinal axis of the arrangement when the adjustment ring is moved up inside the folder portion, and removing said mounting arrangement from said opening. Using such a method, the device and the mounting arrangement may easily be dismounted, without the use of tools, and without destroying the mounting arrangement.

The method may further comprise rotating the outer and inner sleeves in relation to each other, thereby causing the inner sleeve to move out of the first end of the outer sleeve before driving said inner sleeve into said outer sleeve. The inner sleeve may be pushed into the outer sleeve, pushing the wing of the adjustment ring in under the folder portion.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
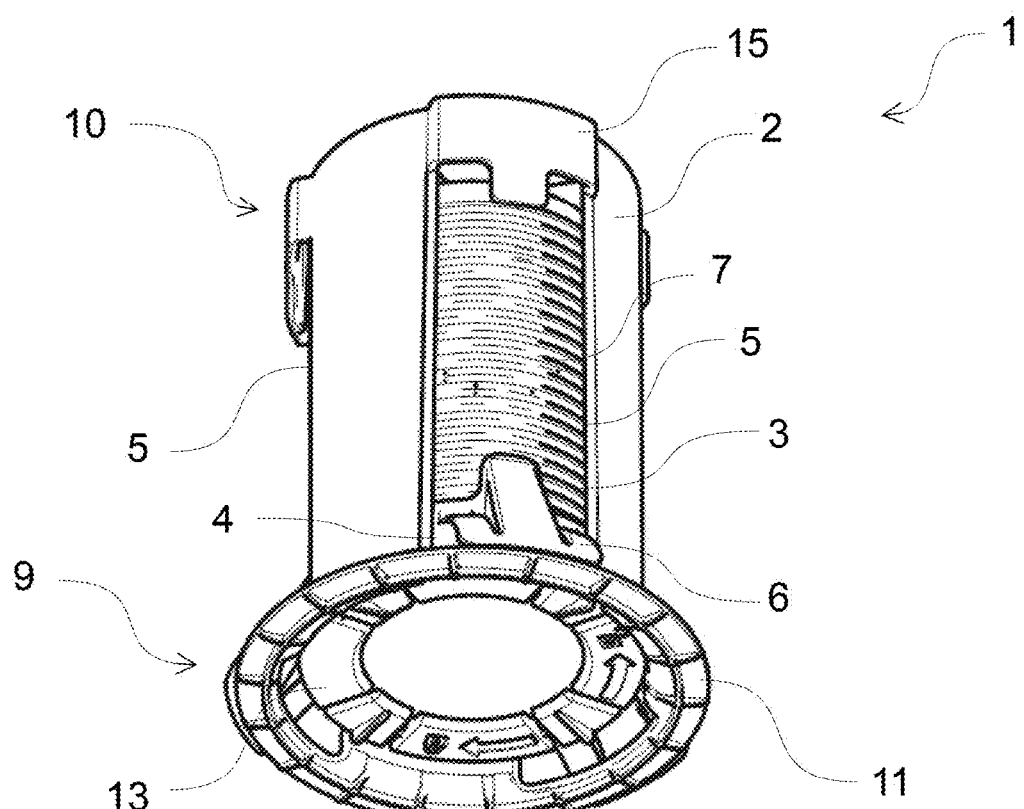
FIG. 1 is a perspective view of an embodiment of a mounting arrangement.

In FIG. 1, an embodiment of a mounting arrangement 1 is shown. The mounting arrangement 1 has three major components, namely an outer sleeve 2, an inner sleeve 3, and an adjustment ring 4, as may also be seen in the exploded view in FIG. 3. The inner sleeve 3 is arranged inside the outer sleeve 2, and the adjustment ring 4 is arranged around the inner sleeve 3, inside the outer sleeve 2. The outer sleeve 2 has three apertures 5 extending longitudinally along the outer sleeve 2. The adjustment ring 4 has three fixing wings 6, each extending generally radially outwardly from the adjustment ring 4 through a respective one of the apertures 5 in the outer sleeve 2. The fixing wings 6 are generally equidistantly spaced around a circumference of the adjustment ring 4. The inner sleeve 3 is provided with an outer thread 7 which is in engagement with an inner thread 8 on an inside of the adjustment ring. The inner thread 8 is not visible in FIG. 1, but may be seen in FIG. 3.

The outer sleeve 2 has a first end 9 and a second end 10. At the first end 9, a flange 11 extends radially outwardly from the outer sleeve 2.

Figure 2:
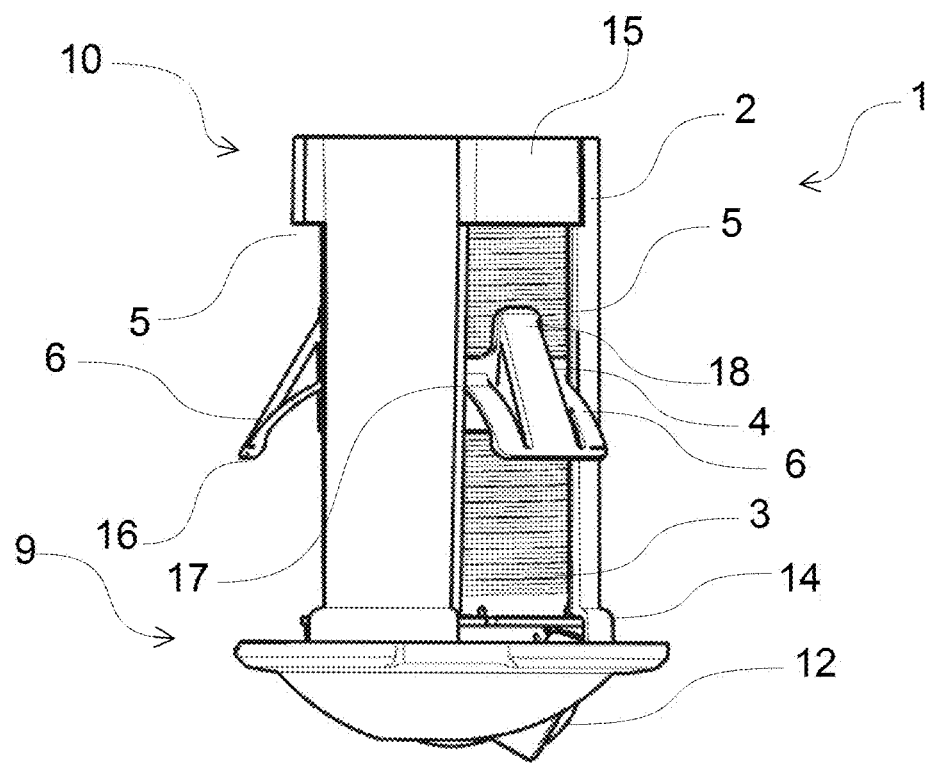
FIG. 2 is a side view of the mounting arrangement of FIG. 1 with a device mounted in the arrangement.

As may be seen in FIG. 2, the first end 9 of the outer sleeve 2 is arranged to receive a device 12 that is to be mounted using the arrangement 1. In this example, the device is a monitoring camera 12.

Returning to FIG. 1, the inner sleeve 3 is also provided with a flange 13. At the first end 9, the outer sleeve 2 has a shoulder portion 14 corresponding to the inner flange 13. The shoulder portion will allow insertion of the inner sleeve 3 into the outer sleeve 2 only until the inner flange 13 abuts the shoulder portion 14.

At the second end 10, the outer sleeve 2 is provided with folder portions 15, one at the end of each aperture 5. Each folder portion generally consists of a wall portion of the outer sleeve 2 having a slightly larger radius of curvature than the rest of the outer sleeve 2. Thereby, the folder portions may each accommodate a respective fixing wing, as will be described further below.

Each fixing wing 6 has an abutment portion 16 at a radially outer end. Further, each fixing wing 6 has three attachment points on the adjustment ring. The attachment points are axially spaced along the height of the adjustment ring 4, such that there are two lower attachment points 17 and one up-per attachment point 18.

Figure 4:
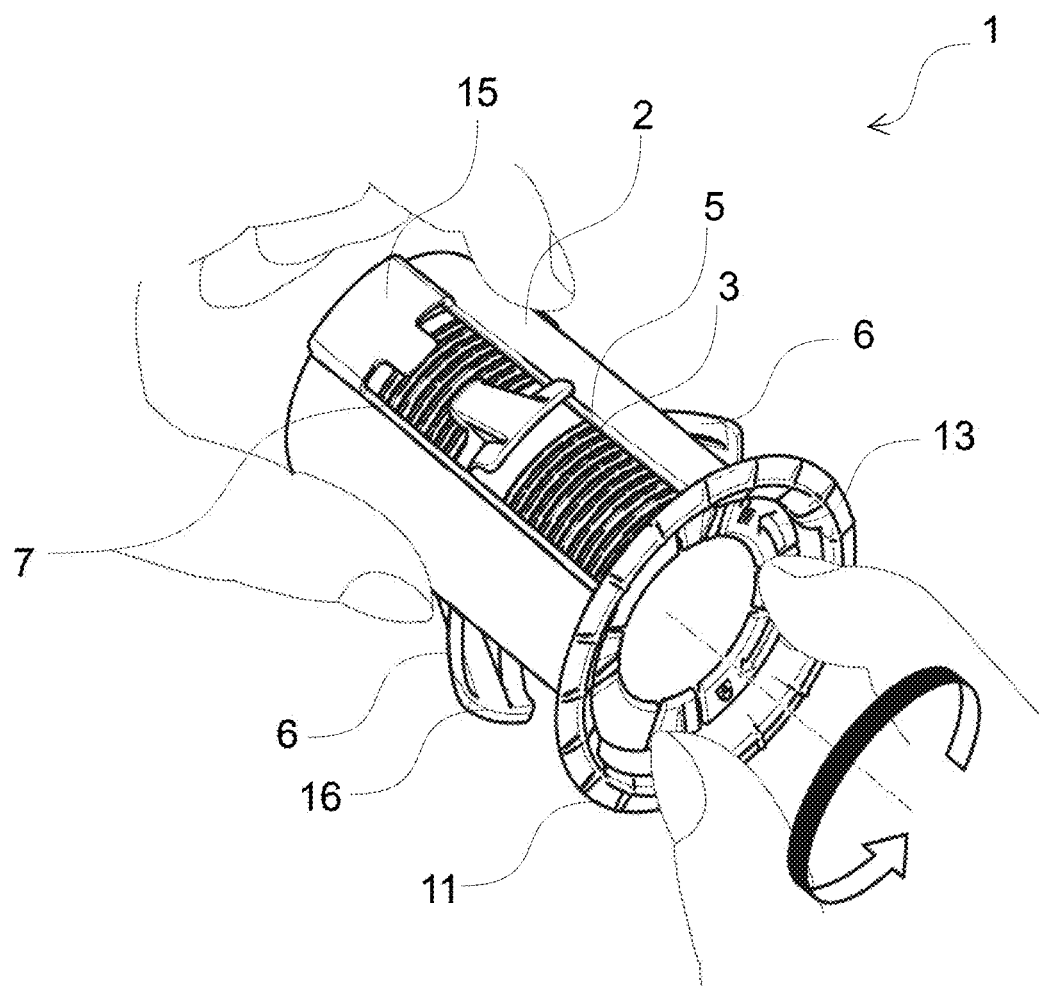
FIG. 4 is a perspective view of the mounting arrangement of FIG. 1 during adjustment.

Mounting of a device using the mounting arrangement 1 will now be described with reference first to FIG. 4. The inner sleeve 3 is rotated in relation to the outer sleeve 2 by means of the inner flange 13. The outer sleeve 2 may be held still while the inner sleeve 3 is rotated or vice versa, or the outer and inner sleeves could both be rotated, but in opposite directions. Since the inner sleeve is provided with the outer thread 7 and the adjustment ring 4 is provided with the inner thread 8, and since the fixing wings 6 extending through the apertures 5 prevent the adjustment ring 4 from rotating in relation to the outer sleeve 2, rotation of the inner sleeve 3 in relation to the outer sleeve 2 will cause the adjustment ring 4 to move along the inner sleeve 3. Thereby, a distance between the outer flange 11 and the abutment portion 16 of the fixing wings 6 may be adjusted in order to be adapted to a thickness of the structure in which the mounting arrangement 1 is to be mounted.

Figure 5A:
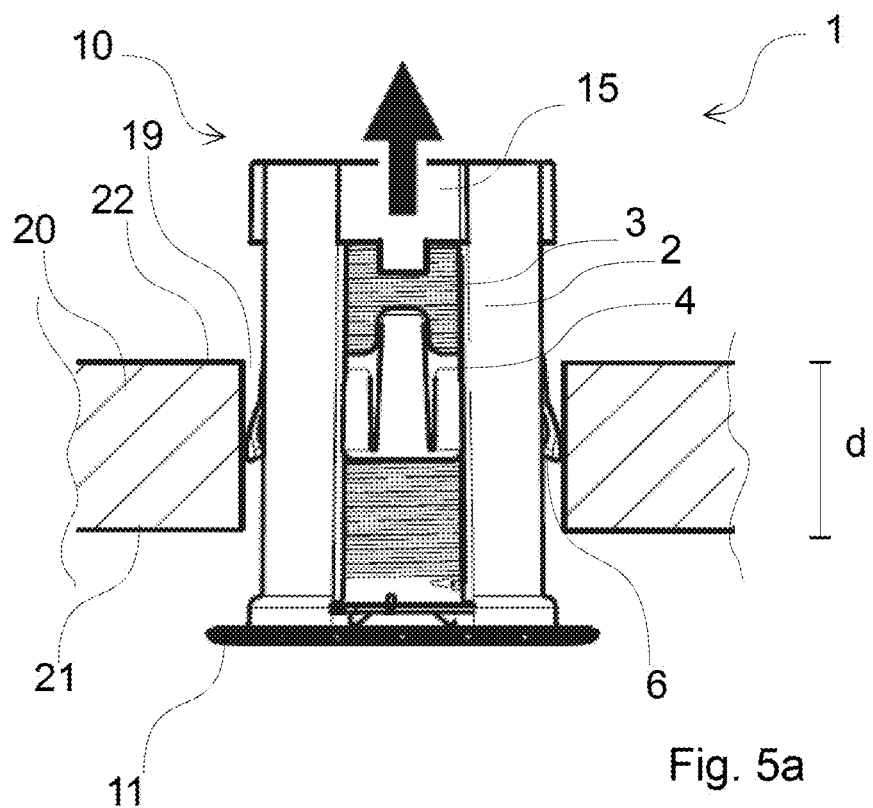
FIGS. 5a and 5b are side views, partially in cross section, of a mounting arrangement being inserted in an opening in a structure.
Figure 5B:
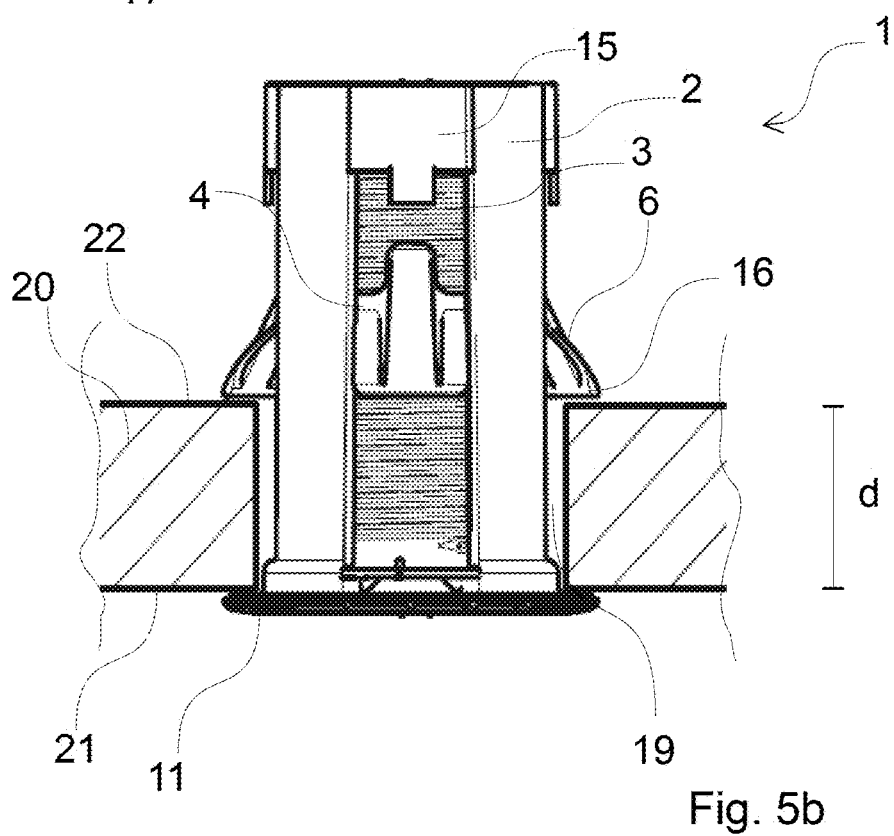

Referring now to FIG. 5a, the mounting arrangement 1 is to be inserted in an opening 19 in a structure, in this case a ceiling 20. The ceiling 20 has a thickness d. Before insertion of the arrangement 1, the adjustment ring 4 should be adjusted such that a distance between the outer flange 11 and the abutment portions 16 of the fixing wings 6 is slightly larger than the thickness d of the ceiling 20. When inserting the mounting arrangement 1 in the opening 19, the second end 10 of the outer sleeve 2 is introduced in the opening 19 and the arrangement 1 is then pushed into the opening 19. The fixing wings 6 of the adjustment ring 4 are flexible, such that they are folded down towards a longitudinal axis of the arrangement 1, or in other words towards the inner sleeve 3. In this manner, the radial extent of the fixing wings 6 is reduced, such that the mounting arrangement 1 may be further inserted into the opening 19, until the flange 11 of the outer sleeve 2 abuts an outer surface 21 of the ceiling 20, as may be seen in FIG. 5b. The flange 11 prevents the mounting arrangement 1 from being inserted too far into the opening 19. When the mounting arrangement 1 has been inserted this far into the opening 19, the fixing wings 6 of the adjustment ring 4 emerge on the inside of the ceiling 20. Thereby, the fixing wings 6 are free to flex back out. The inner sleeve 3 is then once more rotated in relation to the outer sleeve 2, but in a rotation direction that causes the adjustment ring to move back towards the first end 9 of the outer sleeve 2, thus reducing the distance between the outer flange 11 and the abutment portions 16 of the fixing wings 6, until this distance is approximately equal to the thickness d of the ceiling 20. The abutment portion 16 of each fixing wing 6 will thereby abut an inner surface 22 of the ceiling 20. By the abutment of the flange 11 against the outer surface 21 of the ceiling and the abutment of the abutment portions 16 against the inner surface 22, the mounting arrangement 1 is maintained in the opening 19 in the ceiling 20. By having three equidistantly spaced fixing wings 6 on the adjustment ring 4, it is easy to get an even abutment force around the opening 19, ensuring that the mounting arrangement is held straight in the opening. It may be noted that the fact that the fixing wings 6 have attachment points 17, 18 at different heights on the adjustment ring adds structural stability and enables the fixing wings 6 to take higher loads than would be the case if the fixing wings were only attached at one height on the adjustment ring.

Figure 6:
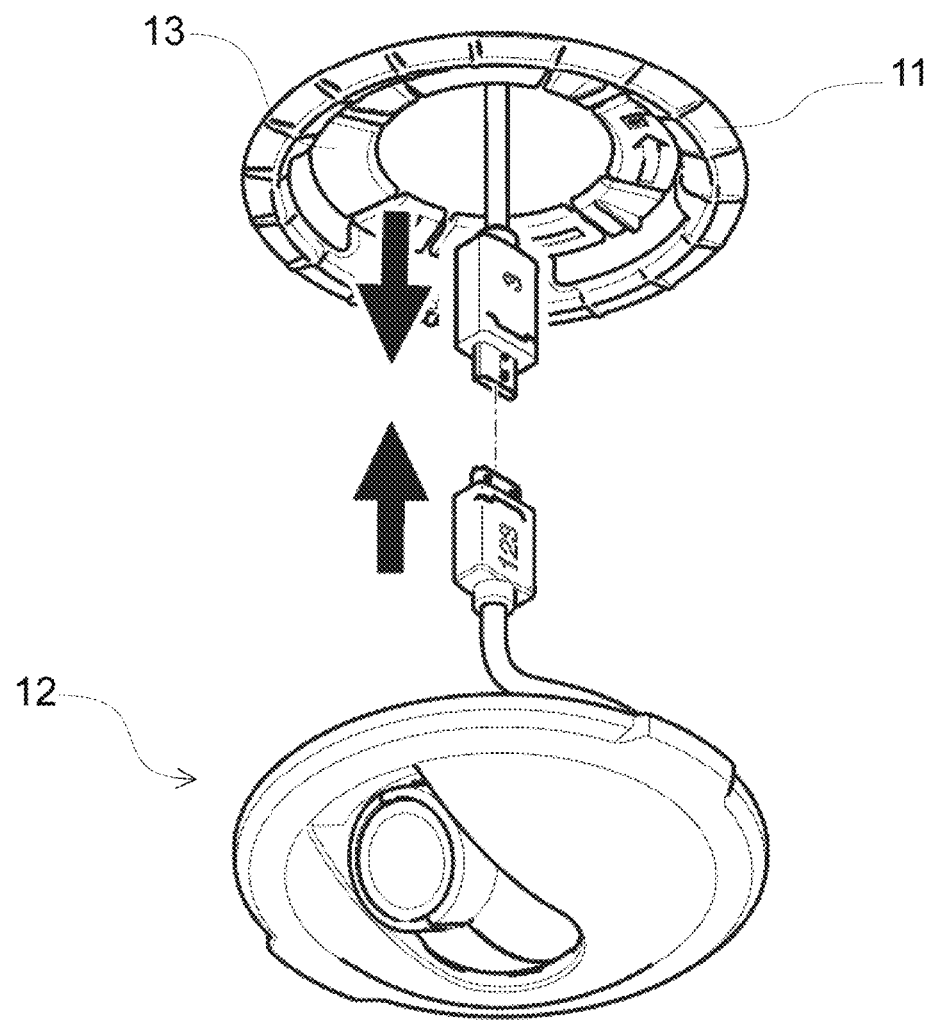
FIG. 6 illustrates insertion of a device in a mounting arrangement.

The camera 12 may now be connected and attached to the mounting arrangement 1 as indicated in FIG. 6. Thus, the camera 12 may easily be recess mounted using a mounting arrangement constructed of only a small number of parts, and not requiring any tool for mounting.

Figure 7A:
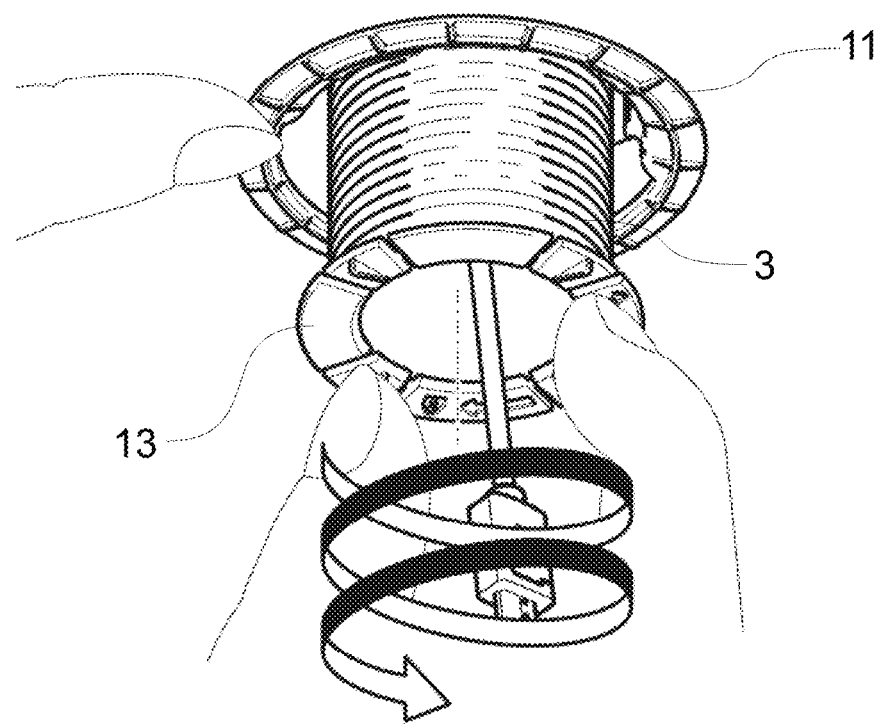
FIGS. 7a-7e are perspective views of the mounting arrangement during dismounting.
Figure 7B:
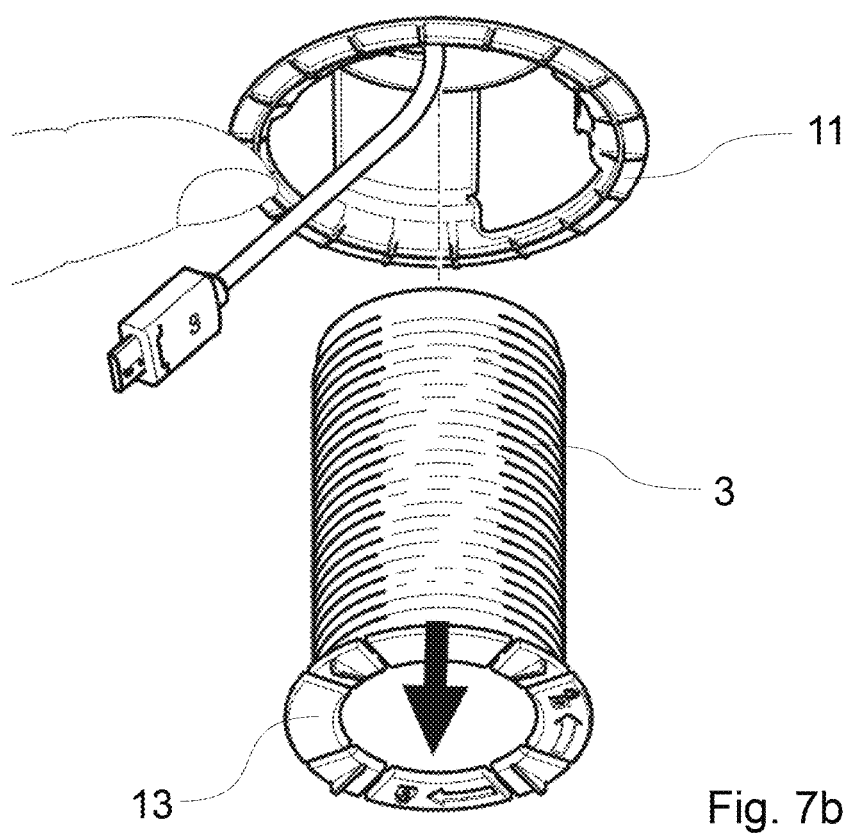
Figure 7C:
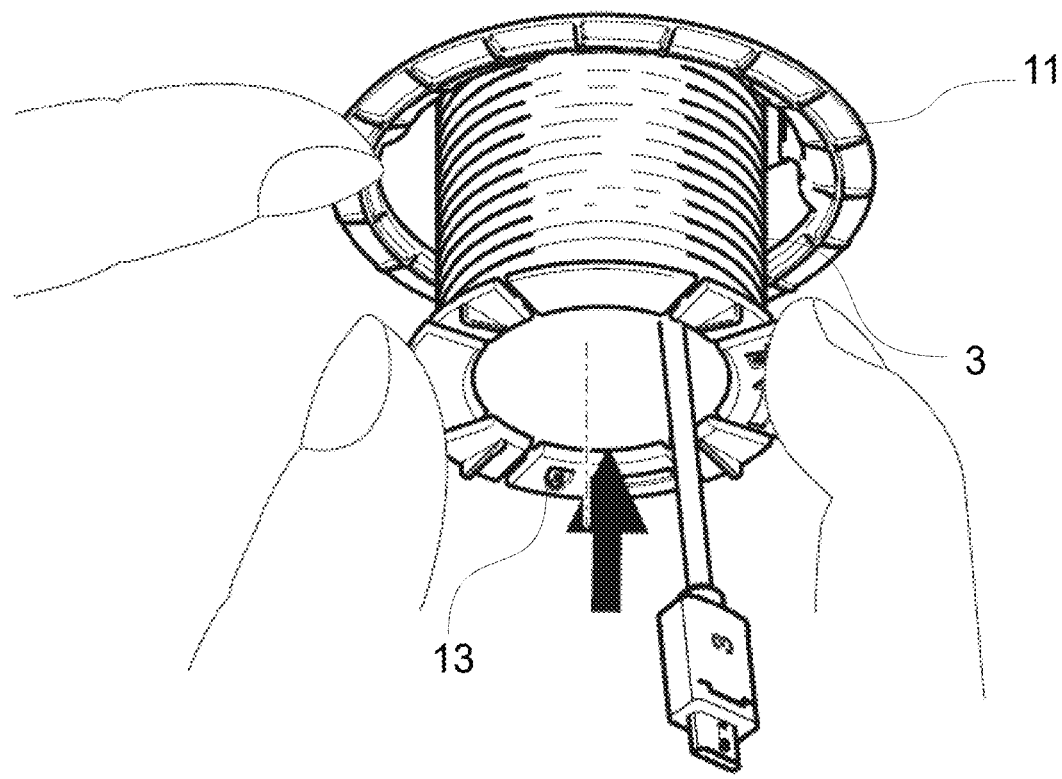
Figure 7D:
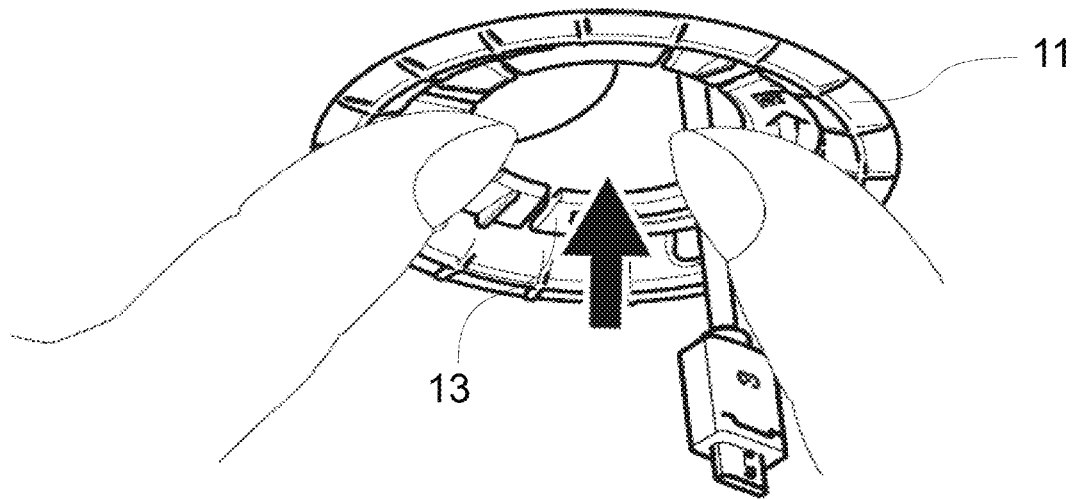
Figure 7E:
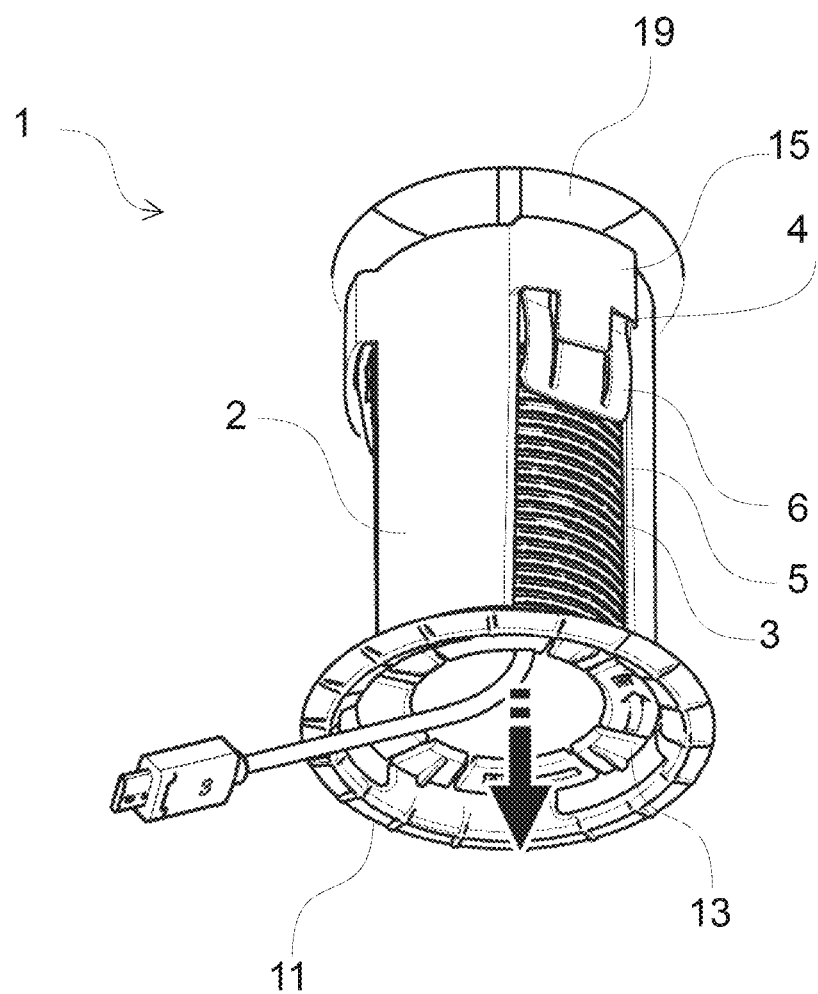

Should it become necessary to dismount the camera 12, this may also be done easily. The camera 12 is detached and disconnected in an operation being essentially the reverse of the one shown in FIG. 6. If only an inspection or repair of the camera 12 is necessary, then the camera 12 may simply be remounted afterwards. Alternatively, the camera 12 may be replaced by another camera of the same or a similar model. However, if necessary, the mounting arrangement 1 may also be removed. As shown in FIG. 7a, the inner sleeve 3 is rotated in relation to the outer sleeve 2, such that the inner sleeve 3 moves outwardly through the first end 9 of the outer sleeve 2. Since the fixing wings 6 of the adjustment ring 4 have been released on the inside of the ceiling 20 and are in abutment against the inner surface 22 of the ceiling, the adjustment ring will remain inside the opening 19. The inner sleeve 3 is rotated until the outer thread 7 is screwed out of the inner thread 8 of the adjustment ring, such that the inner sleeve 3 may be removed from the outer sleeve 2 (see FIG. 7b). As indicated in FIG. 7c, the inner sleeve 3 is then reinserted in the outer sleeve 2, but this time without rotation. With reference to FIG. 7d, the inner sleeve 3 is pushed into the outer sleeve 2, and will eventually contact the adjustment ring 4, pushing it towards the second end of the outer sleeve 2. The adjustment ring 4 is thereby pushed towards the end of the apertures 5, and in under the folder portions 15. The fixing wings 6 are thereby folded down towards the inner sleeve 3, and the remainder of the mounting arrangement 1 may now be removed from the opening 19, as seen in FIG. 7e. In the same way as when inserting the mounting arrangement in the opening, the wings are easily folded down, and the folder portions keep the wings in the folded position during removal of the mounting arrangement. The structural stability of the wings prevents folding of the wings in the wrong direction, i.e. upwardly. Thus, the mounting arrangement 1 may easily be removed without the need of any tools, and without destroying the mounting arrangement or damaging the ceiling 20.

Figure 8:
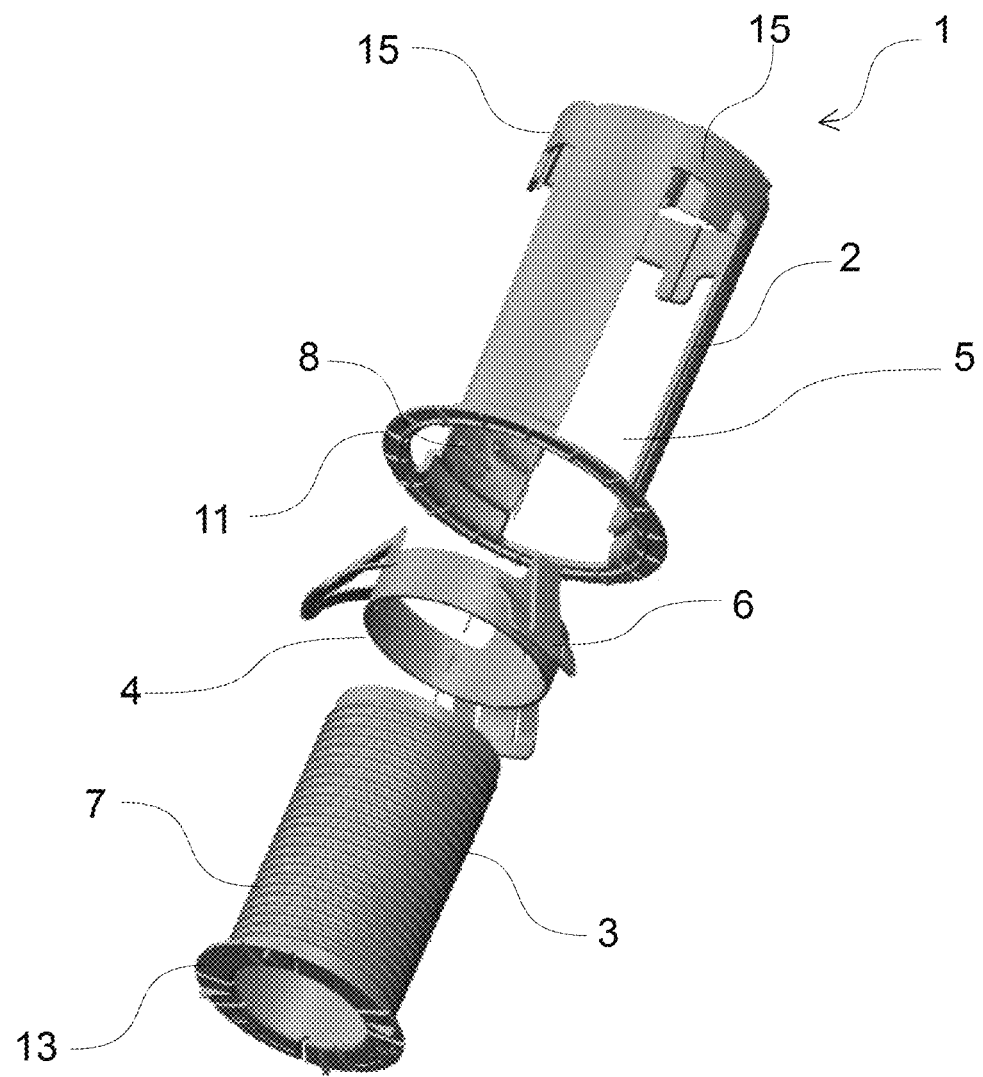
FIG. 8 is an exploded view showing a variation of the mounting arrangement of FIG. 3.

It will be appreciated that a person skilled in the art can modify the above described embodiments in many ways and still use the advantages of the invention as shown in the embodiments above. As an example, instead of arranging the inner thread on the adjustment ring, an inner thread may be provided on the inside of the outer sleeve, as indicated in FIG. 8, such that the inner sleeve directly engages the outer sleeve. In such case, the adjustment ring and the inner sleeve would be modified. The inner sleeve could be made shorter, resembling a ring or nut, and the adjustment ring need in such case not be arranged around the inner sleeve, but should be rotatably connected to the inner sleeve such as to be arranged in series with the inner sleeve along the longitudinal direction of the outer sleeve. To this end, the inner sleeve may be provided with a circumferential groove at one of its ends, and the adjustment ring may be provided with a corresponding circumferential rib. The rib of the adjustment ring may be engaged in the groove of the inner sleeve. Thus, when inserting the inner sleeve and the adjustment ring in the outer sleeve, the adjustment ring could precede or follow the inner sleeve. In other words, the inner sleeve could push or pull the adjustment ring along when moving into the outer sleeve.

Alternatively, the inner sleeve may be formed with a threaded portion at each end, and with a non-threaded portion there between. The adjustment ring may be arranged around the non-threaded portion of the inner sleeve. In this manner, when the inner sleeve is rotated in relation to the outer sleeve, the threaded portions of the inner sleeve engage the inner thread of the outer sleeve, such that the inner sleeve moves longitudinally along the outer sleeve, bringing the adjustment ring with it, but without rotating the adjustment ring.

As described above, for dismounting of the mounting arrangement, the inner sleeve may be screwed out of the outer sleeve and then pushed in for forcing the fixing wings in under the folder portions of the outer sleeve. Alternatively, the inner sleeve may be further rotated for inward movement of the adjustment ring until the fixing wings are forced in under the folder portions and thereby folded down.

In the example described above, the structure in which the camera is mounted is a ceiling, such as a drop ceiling. However, the structure may be a wall, a soffit, a beam or any other structure in which it is desirable to mount the camera. The mounting arrangement is particularly useful for mounting in all kinds of panel shaped structures.

The camera may be a monitoring camera, and may be any type of camera, such as a camera employing visible light, an IR camera, a thermal camera or a TOF camera.

Further, although the example described above refers to the device as being a camera, the device may be any kind of device to be mounted in an opening in a structure, e.g., a spotlight, a loudspeaker or an alarm sensor, such as a PIR sensor.

The device to be mounted may be arranged in the mounting arrangement before or after the mounting arrangement is mounted in the opening.

The parts of the mounting arrangement may be made of plastic, e.g., by moulding. For instance, the adjustment ring may be made of polypropylene (PP), and the outer sleeve and the inner sleeve may be made of a polycarbonate-polybutylene terephthalate copolymer (PC/PBT). The parts could all be made of the same material, or they could be made of different materials. The plastic material could be reinforced with fibres or inserts. Other materials, such as metal, could also be used.

Figure 3:
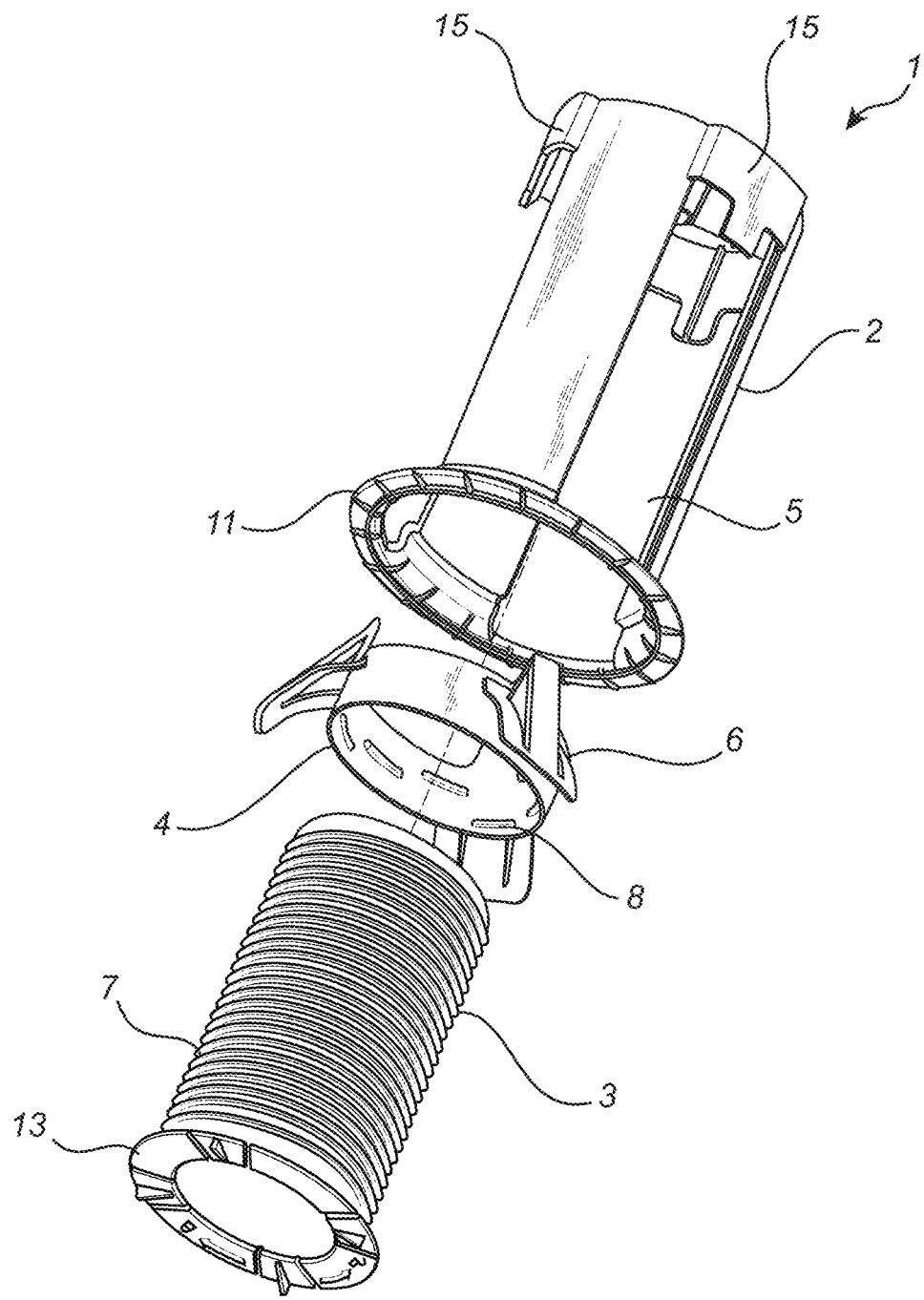
FIG. 3 is an exploded view of the mounting arrangement of FIG. 1.

In the embodiment shown in the drawings, the inner thread of the adjustment ring is not continuous, but divided into discrete sections, as may be seen in the exploded view in FIG. 3. This sectioning is done for manufacturing reasons, in order to enable a simple moulding process. However, if another manufacturing process is used, the inner thread may be made continuous.

The fixing wings may be formed with more or fewer attachment points on the adjustment ring than shown in the drawings.

The folding of the fixing wings may also be enabled in other ways, for instance arranged similar to a collapsible umbrella. The fixing wings may also be formed with a moulded hinge allowing folding in one direction, and with a shoulder preventing folding in the other direction. Alternatively, the fixing wings may be formed with thin portions allowing folding, for instance placing the two lower attachment points lower on the adjustment ring, such that the two corresponding portions of the fixing wings extend horizontally when the fixing wings are in their released state, and fold in two when the fixing wings are folded.

In the embodiment described above, the adjustment ring has three fixing wings. Other numbers of fixing wings could be used. Only one fixing wing may be sufficient, although it will generally be easier to ensure an even distribution of forces if a larger number of fixing wings is used. The number of apertures in the outer sleeve may advantageously be the same as the number of fixing wings, such that each fixing wing extends through its own aperture. One or more fixing wings could otherwise share the same aperture.

The flange on the outer sleeve has been shown as extending continuously around the entire circumference of the first end of the outer sleeve. The skilled person will realize that the flange may as well be partitioned into discrete flange portions. The outer flange could also be made up of as little as two flange portions, rather resembling arms. The flange may be described as extending radially outwardly from the outer sleeve, but if narrow flange portions or arms are used, these need not extend strictly radially, but could be tangential to the outer sleeve.

In the drawings, the adjustment ring is generally circular. However, other shapes of the adjustment ring could be used, as long as they are sufficiently adapted to the shape of the outer sleeve and the inner sleeve. If, for instance, the adjusting ring is to be in threaded engagement with the inner sleeve, the inner circumference of the adjustment should be circular to fit with a circular outer cross section of the inner sleeve, but the outer circumference of the adjustment ring could have another shape, such as an octagonal or otherwise polygonal shape, as long as it allows movement inside the outer sleeve. Further, if the adjustment ring is not to be in threaded engagement with the inner sleeve, the inner circumference also does not need to be circular, but could be given any other shape. Similarly, the outer sleeve and the inner sleeve are shown as generally circular cylinders, but could be given other shapes.

If the opening in which the device is to be mounted is wide compared to the device, the mounting arrangement may be formed with a wider flange at the first end of the outer sleeve. In such case, the fixing wings need not necessarily be foldable for insertion of the mounting arrangement in the opening. Instead, the mounting arrangement could be tilted during insertion for allowing the fixing wings to pass through the opening.

Thus, the invention should not be limited to the shown embodiments but should only be defined by the appended claims.

What is claimed is:

1. A mounting arrangement for mounting a device in an opening in a structure, said arrangement comprising:
   an outer sleeve,
   an inner sleeve arranged inside said outer sleeve,
   an adjustment ring arranged inside said outer sleeve,
   said outer sleeve having a first end and a second end, wherein a flange is arranged at said first end, and wherein said first end is arranged to receive said device,
   said flange extending outwardly from said outer sleeve and being adapted to abut an outer surface of said structure around said opening, said outer sleeve having at least one aperture extending longitudinally along a portion of said outer sleeve, said inner sleeve being arranged in threaded engagement with said adjustment ring or with said outer sleeve, said adjustment ring comprising at least one fixing wing extending outwardly from said adjustment ring through said at least one aperture in said outer sleeve, and said at least one fixing wing being flexible and having an abutment portion adapted to abut an inner surface of said structure around said opening, wherein by relative rotary motion of said inner and outer sleeve, said adjustment ring is movable along a longitudinal direction of said arrangement for adjustment to a thickness of said structure, wherein said outer sleeve at said second end comprises at least one respective folder portion at an end of said at least one aperture, said at least one folder portion being arranged to fold said at least one fixing wing when said adjustment ring is moved up inside said at least one folder portion, wherein said mounting arrangement is removable from said opening when said at least one fixing wing is folded.

2. The mounting arrangement as claimed in claim 1, wherein said inner sleeve has an outer thread and said adjustment ring has an inner thread which is arranged in threaded engagement with said outer thread.

3. The mounting arrangement as claimed in claim 2, wherein said adjustment ring is arranged around said inner sleeve and inside said outer sleeve.

4. The mounting arrangement as claimed in claim 1, wherein said inner sleeve has an outer thread and said outer sleeve has an inner thread which is arranged in threaded engagement with said outer thread.

5. The mounting arrangement as claimed in claim 4, wherein said adjustment ring is attached to said inner sleeve such that rotation of said adjustment ring and said inner sleeve in relation to each other is enabled.

6. The mounting arrangement as claimed in claim 1, wherein said at least one fixing wing is foldable towards a longitudinal axis of said arrangement for insertion into said opening.

7. The mounting arrangement as claimed in claim 1, wherein said at least one fixing wing has at least two axially spaced attachment points on said adjustment ring.

8. The mounting arrangement as claimed in claim 1, said arrangement being made of plastic.

9. A method of mounting a device in an opening in a structure, comprising the steps of:

inserting a mounting arrangement in said opening, said mounting arrangement comprising:

an outer sleeve, an inner sleeve arranged inside said outer sleeve, and an adjustment ring arranged inside said outer sleeve, said outer sleeve having a first end and a second end, wherein a flange is arranged at said first end, and wherein said first end is arranged to receive said device, said flange extending outwardly from said outer sleeve and being adapted to abut an outer surface of said structure around said opening, said outer sleeve having at least one aperture extending longitudinally along a portion of said outer sleeve, said inner sleeve being arranged in threaded engagement with said adjustment ring or with said outer sleeve, said adjustment ring comprising at least one fixing wing extending outwardly from said adjustment ring through said at least one aperture in said outer sleeve, said at least one fixing wing being flexible and having an abutment portion adapted to abut an inner surface of said structure around said opening, wherein by relative rotary motion of said inner and outer sleeve, said adjustment ring is movable along a longitudinal direction of said arrangement for adjustment to a thickness of said structure, wherein said outer sleeve at said second end comprises at least one respective folder portion at an end of said at least one aperture, said at least one folder portion being arranged to fold said at least one fixing wing when said adjustment ring is moved up inside said at least one folder portion;

abutting said flange against said outer surface of said structure around said opening, rotating said outer and inner sleeves in relation to each other, thereby causing said adjustment ring to move along a longitudinal direction of said arrangement, until said at least one fixing wings abuts an inner surface of said structure around said opening, and arranging said device in said arrangement.

10. The method as claimed in claim 9, wherein said device is arranged in said arrangement after said mounting arrangement has been mounted in said opening.

11. The method as claimed in claim 9, wherein said at least one fixing wing is folded down towards a longitudinal axis of said arrangement by inserting said mounting arrangement in said opening.

12. A method of dismounting a device mounted in an opening in a structure, the method comprising:

for a mounting arrangement comprising:

an outer sleeve, an inner sleeve arranged inside said outer sleeve, and an adjustment ring arranged inside said outer sleeve, said outer sleeve having a first end and second end, wherein a flange is arranged at said first end, and wherein said first end is arranged to receive said device, said flange extending outwardly from aid outer sleeve and being adapted to abut an outer surface of said structure around said opening, said outer sleeve having at least one aperture extending longitudinally along a portion of said outer sleeve, said inner sleeve being arranged in threaded engagement with said adjustment ring or with said outer sleeve, said adjustment ring comprising at least one fixing wing extending outwardly from said adjustment ring through at least one aperture in said outer sleeve, said at least one fixing wing being flexible and having an abutment portion adapted to abut an inner surface of said structure around said opening, wherein by relative rotary motion of said inner and outer sleeve, said adjustment ring is movable along a longitudinal direction of said arrangement for adjustment to a thickness of said structure, performing the method comprising:

driving said inner sleeve into said outer sleeve causing said adjustment ring to move along said outer sleeve, until said at least one fixing wing reaches at least one folder portion arranged at an end of said at least one aperture at said second end of said outer sleeve, such that said at least one fixing wing is folded down towards a longitudinal axis of said arrangement when said adjustment ring is moved up inside said at least one folder portion, and removing said mounting arrangement from said opening.

13. The method as claimed in claim 1, further comprising rotating said outer and inner sleeves in relation to each other, thereby causing said inner sleeve to move out of the first end of said outer sleeve before driving said inner sleeve into said outer sleeve.

* * * * *